US008161094B2

(12) United States Patent
White et al.

(10) Patent No.: US 8,161,094 B2
(45) Date of Patent: Apr. 17, 2012

(54) SYSTEM AND METHOD FOR NOTIFICATION WITHIN DECENTRALIZED NETWORK (75) Inventors: Payton R. White, Foster City, CA (US); John P. Bates, Redwood City, CA (US); Howard Berkey, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 2415 days.

(21) Appl. No.: 10/856,565

(22) Filed: May 27, 2004

(65) Prior Publication Data

US 2004/0249972 A1     Dec. 9, 2004

Related U.S. Application Data (60) Provisional application No. 60/476,084, filed on Jun. 4, 2003.

(51) Int. Cl.
*G06F 15/16* (2006.01)
*G06F 15/173* (2006.01)

(52) U.S. Cl. .......................... 709/201; 709/226
(58) Field of Classification Search .................. 709/201, 709/243
See application file for complete search history.

(56) References Cited

U.S. PATENT DOCUMENTS

| | | | |
|---|---|---|---|
| 7,136,645 B2 * | 11/2006 | Hanson et al. | 455/435.1 |
| 7,197,565 B2 * | 3/2007 | Abdelaziz et al. | 709/226 |
| 7,840,658 B2 * | 11/2010 | Sinn | 709/223 |
| 7,853,643 B1 * | 12/2010 | Martinez et al. | 709/203 |
| 2003/0004774 A1 * | 1/2003 | Greene et al. | 705/8 |
| 2003/0065774 A1 * | 4/2003 | Steiner et al. | 709/225 |
| 2003/0177187 A1 * | 9/2003 | Levine et al. | 709/205 |
| 2003/0187974 A1 * | 10/2003 | Burbeck et al. | 709/224 |
| 2004/0088348 A1 * | 5/2004 | Yeager et al. | 709/202 |
| 2004/0088369 A1 * | 5/2004 | Yeager et al. | 709/217 |
| 2004/0133640 A1 * | 7/2004 | Yeager et al. | 709/204 |
| 2004/0162871 A1 * | 8/2004 | Pabla et al. | 709/201 |

OTHER PUBLICATIONS

Rosenberg, et al., "SIP for Presence," Internet, Nov. 13, 1998, Bell Laboratories, Columbia University, New York, NY.
Huang, et al., "Publish/Subscribe in a Mobile Environment," http://dbpubs.stanford.edu:8090/pub/2001-15>, 2001, Stanford University, Palo Alto, CA.
Stoica et al., "Chord: A Scalable Peer-to-Peer Lookup Service for Internet Applications," http://pdos.lcs.mit.edu/chord/, Oct. 2001, Computer Communication Review, Association for Computing Machinery, New York.

\* cited by examiner

*Primary Examiner* — Kenny Lin
*Assistant Examiner* — Gerald Smarth
(74) *Attorney, Agent, or Firm* — Martine Penilla Group, LLP (57) ABSTRACT

Methods are provided for event notification in a decentralized peer-to-peer (P2P) network. Each node within the P2P network can publish a subscription object for a published resource. Through the use of common identifiers, each subscription object is co-located with a corresponding publish object for the resource. Upon receiving notification of an event associated with the resource, the node responsible for the publish object for the resource distributes the event notification to each node present on the corresponding subscription registry. Therefore, nodes within the P2P network that are interested in a resource are capable of establishing a persistent query for the resource by publishing a subscription object for the resource on the responsible node.

45 Claims, 7 Drawing Sheets

SYSTEM AND METHOD FOR NOTIFICATION WITHIN DECENTRALIZED NETWORK

CROSS-REFERENCE TO RELATED APPLICATIONS

This application claims priority from U.S. Provisional Patent Application No. 60/476,084, filed on Jun. 4, 2003, and entitled "Virtual/Real World Dynamic Intercommunication Methods and Systems," which is incorporated herein by reference. This application is also related to U.S. patent application Ser. No. 10/857,424, filed on even date herewith and entitled "Method and System for Persisting Content in Decentralized Network," which is incorporated herein by reference.

BACKGROUND

1. Field of the Invention

The present invention relates generally to data communication across a decentralized network of computing systems.

2. Description of the Related Art

A decentralized computing environment is defined by a number of computing systems interconnected to communicate with one another, wherein each computing system can perform both client and server functions. A peer-to-peer (P2P) network represents a decentralized computing environment in which each computing system within the P2P network is defined as a peer of every other computing system within the network. For discussion purposes, each peer computing system within the P2P network is referred to as a node. Each node within the P2P network is defined to have substantially equivalent computing capability. Additionally, each node within the P2P network is configured to execute software having substantially equivalent functionality. Therefore, each node is enabled to act as both a provider and a user of data and services across the P2P network.

In the P2P network, a node may be responsible for producing and providing, i.e., publishing, a resource for use by other nodes within the P2P network. Conventionally, the node publishing the resource is responsible for providing notifications associated with the resource to the other nodes within the P2P network. For example, service software executing across the various nodes of the P2P network can operate to allow a number of nodes to become aware of a revision to a particular resource produced by a particular node. Once the particular resource is revised, the particular node becomes responsible for distributing the revised resource across the P2P network to each node that submits a request for the resource revision.

In a situation where a significant number of nodes submit requests for a particular resource, or revision thereof, the node responsible for producing and providing the resource can become overloaded with resource distribution responsibility. Additionally, if a node is responsible for producing and providing multiple resources, combined requests for the multiple resources can result in overwhelming resource distribution responsibility for the responsible node. When a particular node in the P2P network becomes overwhelmed with resource production and distribution responsibility, the distributed characteristics of the P2P network become more centralized. Furthermore, since efficient communication within the P2P network is dependent on the ability of nodes to function equivalently as both clients and servers, centralization of the P2P network resulting from unbalanced resource responsibility is detrimental to overall P2P network performance.

SUMMARY

The present invention provides for event notification in a decentralized peer-to-peer (P2P) network. More specifically, the present invention allows nodes within the P2P network to publish subscription objects for published resources. Through the use of common identifiers, each subscription object is co-located with a corresponding publish object, wherein the publish object points to a corresponding published resource within the P2P network. Therefore, a node assigned responsibility for the publish object is also assigned responsibility for the various subscription objects associated with the publish object. Each subscription object represents an address of a node, i.e., subscriber node, interested in the published resource to which the associated publish object points. Thus, the combination of subscription objects for a published resource represents a subscription registry for the publish object that points to the published resource. Upon receiving notification of an event associated with the resource, the node responsible for the corresponding publish object distributes the event notification to each node present on the corresponding subscription registry. Therefore, nodes within the P2P network that are interested in a resource are capable of establishing a persistent query for the resource by publishing a subscription object for the resource on the node responsible for the publish object that points to the resource.

In one embodiment, a system for event notification in a decentralized network of interconnected nodes is disclosed. The system includes a first node defined to produce a resource for publication across the decentralized network. The system also includes a second node defined to be responsible for a resource identifier for the resource produced by the first node. The second node is defined to maintain a subscription registry for the resource. The system further includes a third node defined to identify the second node as being responsible for the resource identifier. The third node is further defined to publish a subscription object for the resource. The second node responds to the subscription object by entering the third node on the subscription registry for the resource produced by the first node.

In one embodiment, a method for establishing a subscription registry for a published resource in a decentralized network of interconnected nodes is disclosed. The method includes an operation for producing a resource at a first node for publication across the decentralized network. An operation is also performed to generate a hash value for the resource produced at the first node. In another operation, a second node is identified as being responsible for a hash value range bounding the hash value generated for the resource. The method further includes an operation for assigning responsibility for the resource to the second node. Also in the method, an operation is performed to establish a subscription registry for the resource. The subscription registry is maintained by the second node.

In one embodiment, a computer readable media including program instructions for establishing a subscription registry for a published resource in a decentralized network of interconnected nodes is disclosed. Program instructions are included for producing a resource at a first node for publication across the decentralized network. Program instructions are also included for generating a hash value for the resource produced at the first node. Additionally, program instructions are included for identifying a second node as being responsible for a hash value range bounding the hash value generated for the resource. The computer readable media further includes program instructions for assigning responsibility for the resource to the second node and establishing a subscription registry for the resource. The subscription registry is maintained by the second node.

In one embodiment, a method for subscribing to a resource published within a decentralized network of interconnected nodes is disclosed. In accordance with the method, a hashing operation is performed on a key associated with a resource. The hashing operation generates a hash value associated with the resource. The method also includes an operation for publishing a subscription object for the resource. The subscription object is assigned a hash value equivalent to the hash value associated with the resource. In another operation, the subscription object is transmitted to a node responsible for the hash value associated with both the resource and the subscription object for the resource. The method further includes an operation for operating the node responsible for the hash value, associated with both the resource and subscription object for the resource, to update a subscription registry for the resource to include information contained within the subscription object for the resource.

In one embodiment, a computer readable media including program instructions for subscribing to a resource published within a decentralized network of interconnected nodes is disclosed. Program instructions are included for performing a hashing operation on a key associated with a resource. The hashing operation generates a hash value associated with the resource. Also, program instructions are included for publishing a subscription object for the resource. The subscription object is assigned a hash value equivalent to the hash value associated with the resource. Program instructions are also provided for transmitting the subscription object to a node responsible for the hash value associated with both the resource and the subscription object for the resource. Additionally, program instructions are provided for operating the node responsible for the hash value, associated with both the resource and subscription object for the resource, to update a subscription registry for the resource to include information contained within the subscription object for the resource.

In one embodiment, a computing device is disclosed. The computing device includes a processor and a memory capable of storing program instructions to be executed by the processor. The program instructions stored in the memory include computer code for accepting responsibility for a resource having an associated hash value within a hash value range assigned to the computing device. The program instructions also include computer code for establishing a subscription registry for the resource. The program instructions further include computer code for receiving subscription objects from other computing devices and recording the subscription objects in the subscription registry. Additionally, the program instructions include computer code for notifying computing devices having a recorded subscription object in the subscription registry of an event associated with the resource.

In one embodiment, a mechanism for providing event notification in a decentralized network of interconnected nodes is disclosed. The mechanism includes means for establishing a subscription registry for a resource published within the decentralized network. Means are also included for receiving a subscription object for the resource from a node within the decentralized network. The mechanism also includes means for recording the subscription object in the subscription registry for the resource. Further, means are provided for receiving an update to the resource. Means are also provided for notifying each node having a subscription object recorded in the subscription registry for the resource of the update to the resource.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

The present invention provides for event notification in a decentralized peer-to-peer (P2P) network. More specifically, the present invention allows nodes within the P2P network to publish subscription objects for published resources, wherein each subscription object represents a request for a published resource. Through the use of common identifiers, each subscription object is co-located with a corresponding publish object, wherein the publish object points to a corresponding published resource within the P2P network. Therefore, a node assigned responsibility for the publish object is also assigned responsibility for the various subscription objects associated with the publish object. Each subscription object represents an address of a node, i.e., subscriber node, interested in the published resource to which the associated publish object points. Thus, the combination of subscription objects for a published resource represents a subscription registry for the publish object that points to the published resource. Upon receiving notification of an event associated with the resource, the node responsible for the corresponding publish object distributes the event notification to each node present on the corresponding subscription registry. Therefore, nodes within the P2P network that are interested in a resource are capable of establishing a persistent query for the resource by publishing a subscription object for the resource on the node responsible for the publish object that points to the resource.

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
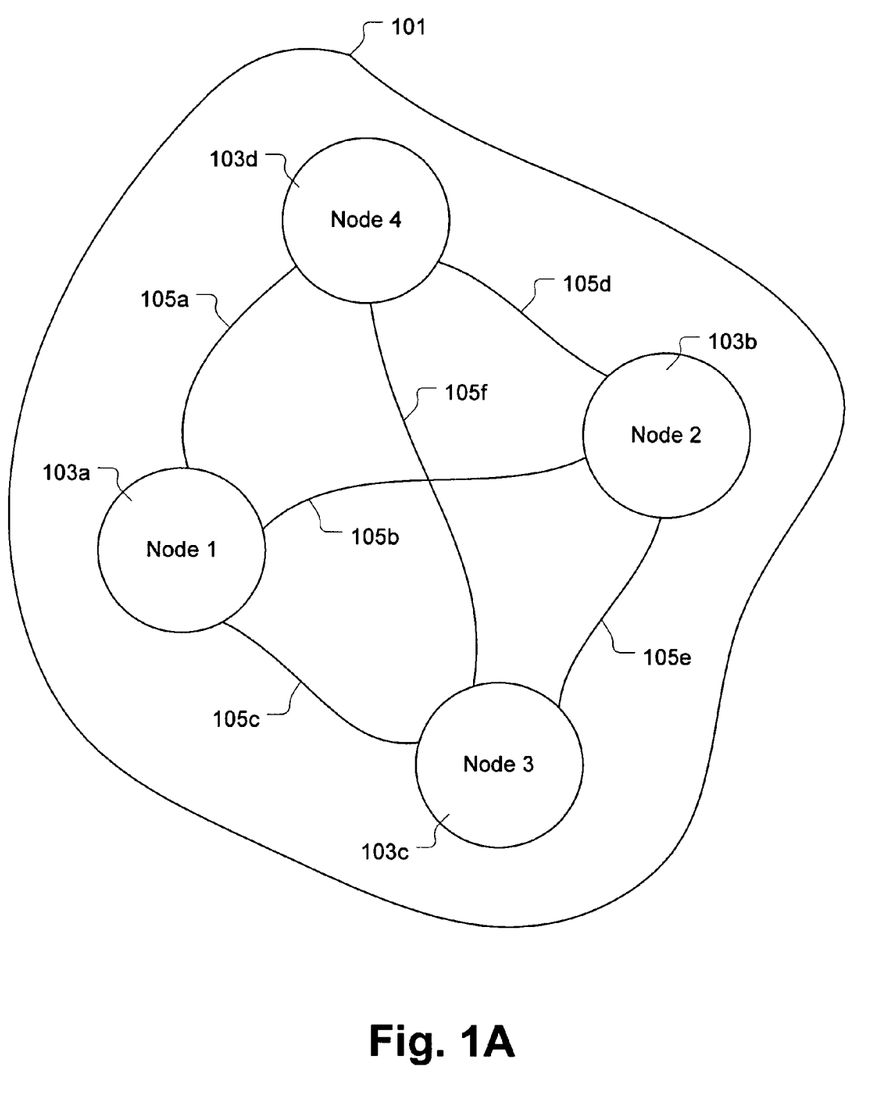
FIG. 1A is an illustration showing an exemplary P2P network, in accordance with one embodiment of the present invention.

FIG. 1A is an illustration showing an exemplary P2P network 101, in accordance with one embodiment of the present invention. The exemplary P2P network includes four nodes: Node 1 (103a), Node 2 (103b), Node 3 (103c), and Node 4 (103d). Each node is interconnected by links 105a-105f to communicate with the other nodes in the P2P network 101. It should be appreciated, however, that the exemplary P2P network 101 represents one of an essentially limitless number of possible P2P network configurations. For example, other P2P network embodiments can include any number of nodes. Also, in other P2P network embodiments, each node in the P2P network may be connected to communicate directly with a subset of the other nodes within the P2P network, rather than with all of the other nodes within the P2P network. Additionally, some P2P networks may require communication between certain nodes to be propagated through one or more intermediate nodes. For example, the nodes of the P2P network may be connected in a ring-like manner such that each node is connected to a predecessor node and a successor node. Thus, in this example, communication between two nodes may require propagation around the ring-like P2P network by intermediate nodes. For discussion purposes, the present invention is described herein in the context of the exemplary P2P network 101 as shown in FIG. 1A. It should be understood, however, that the principles of the present invention as described herein are equally applicable to any other P2P network configuration.

Figure 1B:
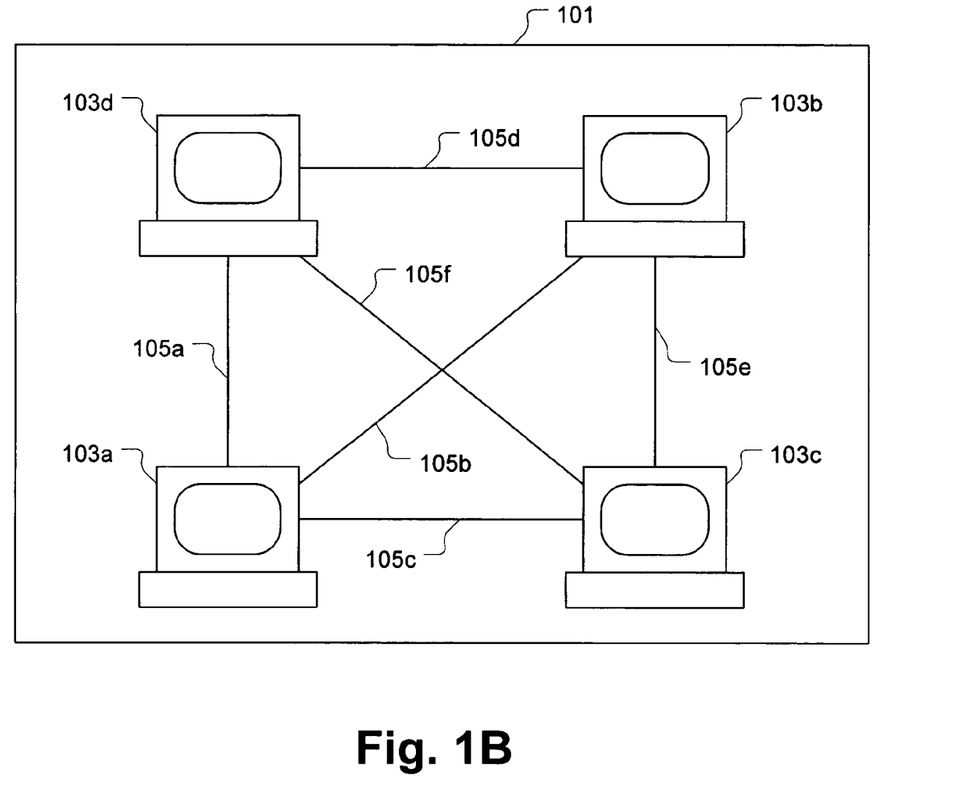
FIG. 1B is an illustration showing the exemplary P2P network in which each node is depicted as a computing system, in accordance with one embodiment of the present invention.

It should be appreciated that each node 103a-103d of the P2P network 101, represents a computing system. FIG. 1B is an illustration showing the exemplary P2P network 101 in which each node is depicted as a computing system, in accordance with one embodiment of the present invention. In one embodiment, each computing system has essentially equivalent computing capability and operates software providing essentially equivalent functionality. However, in other embodiments, the various computing systems may differ in terms of computing capability. Regardless of the particular embodiment, however, each computing system includes at least a processor, a memory, and a communication interface. Additionally, each computing system can include other common computer components and peripheral devices, such as storage components, display components, user interface components, etc. In various embodiments, communication between the nodes 103a-103d can be enabled by a wireless network, a physical network, or a combination thereof, as known to those skilled in the art.

Each node within the P2P network includes overlay software and logic to enable navigation of the P2P network and communication between nodes within the P2P network. The overlay software operating on each node of the P2P network also allows resources published by nodes within the P2P network to be identified, located, and accessed. Thus, the overlay software can implement a distributed lookup protocol for locating resources within the P2P network. More specifically, given a key, the distributed lookup protocol can map the key onto a node of the P2P network. Therefore, if the key is associated with a particular resource, the distributed lookup protocol can be used to locate the node containing information regarding the particular resource. An example of a distributed lookup protocol is Chord, such as described in "Chord: A Scalable Peer-to-Peer Lookup Service for Internet Applications," by Stoica et al., (August 2001), in the Proceedings of AGM SIGCOMM 2001, San Diego, Calif., and also published at: http://pdos.lcs.mit.edu/chord/.

One type of distributed lookup protocol, such as Chord, uses a hashing operation to assign key/resource pairs to nodes within the P2P network. The hashing operation uses a hash function to produce unique identifiers to be assigned to each node and each key. The unique identifiers are of fixed size, wherein the size is large enough to ensure uniqueness among produced identifiers. With respect to the present invention, a consistent hash function is used to provide deterministic repeatability of identifiers for given nodes and keys. Thus, with the consistent hash function, the same unique identifier will be consistently produced for a given key or a given node. In one embodiment, a node identifier is produced by hashing the node's interne protocol (IP) address. Also, in one embodiment, a key identifier is produced by hashing the key.

The SHA-1 hash algorithm, as known to those skilled in the art, uses a consistent hash function to accept an arbitrary length of data and generate a 20 bit hash value of that data. The 20 bit hash value provides enough unique identifiers to essentially eliminate concern regarding repeating identifiers. It should be understood that the terms "hash value" and "identifier" are used interchangeably within the present description, and each term refers to the output generated by a consistent hash function.

Each node within the P2P network is assigned an approximately equal portion of a finite hash value domain, wherein each portion of the hash value domain represents a range of hash values. The distribution of hash value range responsibility among nodes in the P2P network can be viewed as representing a distributed hash table (DHT) by which a given hash value can be mapped to a node to which it is assigned. Additionally, the hashing operation balances load among the nodes of the P2P network by assigning roughly the same number of keys to each node. Due to the inherent load balancing characteristic of the hashing operation when assigning responsibility for different resources within the P2P network, it is most likely that different nodes will be assigned responsibility for resources in a substantially uniform manner. Therefore, the hashing operation serves to provide uniform distribution of key/resource pairs among the nodes of the P2P network. Those skilled in the art will appreciate the details associated with use of hashing functions and DHTs for mapping key/resource pairs to nodes within a P2P network.

The present invention provides event notification in a decentralized network, i.e., P2P network. More specifically, the present invention uses the addressing scheme of DHT grids to co-locate subscription objects associated with a resource on a node responsible for a publish object corresponding to the resource. Thus, the present invention leverages the deterministic hashing algorithm used in DHT-based grids to create resource identifiers for storage that can also be used as a direct lookup for subscriptions for the given resource. Subscriptions found for the resource can represent either a list of subscribers to the resource, or members of a registry of subscribed nodes. Also, with the present invention, interest-specific sub-grids can be used to localize subscriptions. As will be described below, the present invention avoids traditional publish-subscribe bottlenecks in completely server based (centralized) event notification schemes.

In a P2P network, nodes can publish resources by first generating a unique identifier for the resource. For example, as previously discussed, a hashing operation can be performed to create the unique identifier for the resource, wherein the unique identifier is associated with a key of the resource. An important feature of the hashing operation is deterministic repeatability that allows the same unique identifier to be consistently created for the same resource given the same key of the resource. The resource is published on the P2P network by determining the responsible node that owns the hash value range that includes the unique identifier associated with the resource. A publish object for the resource is then located on the responsible node. The publish object serves as a pointer to the resource within the P2P network. Subsequent requests for the identifier corresponding to the resource are routed to the responsible node and processed via the publish object for the resource.

A subscription object can be published to the P2P network using the same procedure that created the unique identifier for the resource and determined the node responsible for the publish object associated with resource. The subscription object includes a reference to a node interested in the resource, or a reference to a sub-grid containing a node interested in the resource. The same key used to create the unique identifier for the resource is also used to create the unique identifier for the subscription object. Therefore, the same identifier is generated for both the publish object and the subscription object corresponding to the resource. Consequently, both the publish object and the subscription object are stored on the same physical node. Co-location of the publish object and the subscription object on the same physical node serves to reduce latency related to publish-subscribe processing. Also, co-location of the publish object and the subscription object on the same physical node leverages the load balancing characteristic of the DHT for publish-subscribe processing. Therefore, event notification provided by the present invention scales more favorably in overhead and latency with respect to centralized, i.e., server-based, solutions.

In the context of the present invention, the term "resource" is used to represent anything that may be of interest to an entity within the P2P network. For example, in one embodiment, the resource can represent a direct mapping to a file or data item. In another embodiment, the resource can represent a mapping to a property of a file or data item. In yet another embodiment, the resource can represent a mapping to a quality or state of a data item. Each resource has a commonly understood name or naming convention. The name of each resource can be hashed into an identifier, i.e., hash value, for the resource. As previously discussed, the identifier can be used to determine the node responsible for queries associated with the resource. Thus, the publish object and the subscription objects associated with the resource hash to the same identifier for the resource. Therefore, the publish object and related subscription objects are co-located on the node responsible for queries associated with the resource.

Figure 2:
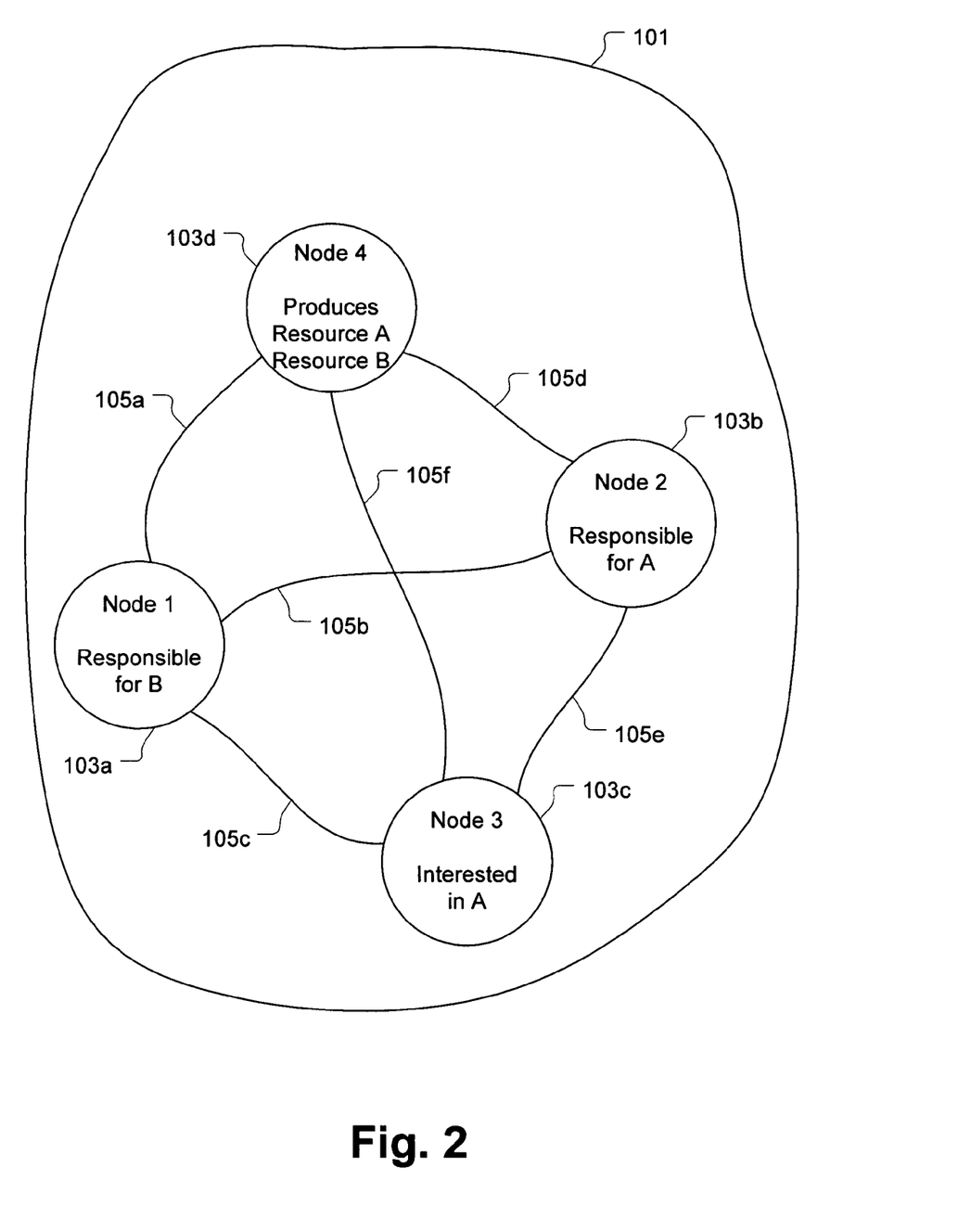
FIG. 2 is an illustration showing the P2P network of FIG. 1A operating to provide event notification in accordance with one embodiment of the present invention.

FIG. 2 is an illustration showing the P2P network 101 of FIG. 1A operating to provide event notification in accordance with one embodiment of the present invention. Node 4 (103*d*) operates to produce resources A and B. A key associated with resource A is hashed to create a unique hash value A'. Node 2 (103*b*) is responsible for the hash range bounding the hash value A'. A key associated with resource B is hashed to create a unique hash value B'. Node 1 (103*a*) is responsible for the hash range bounding the hash value B'. In one embodiment, Node 4 (103*d*) transmits a publish object for resource A to Node 2 (103*b*) and a publish object for resource B to Node 1 (103*a*).

Consider that Node 3 (103*c*) is interested in resource A and wishes to subscribe to resource A. By hashing the key for resource A, Node 3 (103*c*) determines that Node 2 (103*b*) is responsible for resource A. Node 3 (103*c*) operates to transmit a subscription object for resource A to Node 2. In one embodiment, the subscription object for resource A is defined as a reference to Node 3 (103*c*), such as an IP address for Node 3 (103*c*). Since resource A and the subscription object for resource A have the same key, they hash to the same value for which Node 2 (103*b*) is responsible. Therefore, Node 2 (103*b*) is responsible for storing the subscription object for resource A created by Node 3 (103*c*). Node 2 (103*b*) is also responsible for storing any other subscription objects for resource A, published by any other node within the P2P network 101. The subscription objects for resource A stored on Node 2 (103*b*) combine to represent a subscription registry for resource A.

Consider that Node 4 (103*d*) produces an update to resource A. Based on the hash value A' for resource A, Node 4 (103*d*) is able to determine that Node 2 (103*b*) is responsible for resource A. In following, Node 4 (103*d*) transmits the update information associated with resource A to Node 2 (103*b*). After having received the update information associated with resource A, Node 2 (103*b*) is responsible for disseminating the update information to each node present on the subscription registry for resource A.

In one exemplary embodiment, the update information can represent additional identifiers related to either the DHT or to an application-level protocol. In another exemplary embodiment, the update information can represent a copy of the original resource. In yet another exemplary embodiment, the update information can represent a delta-compressed version of changed portions of the resource. It should be appreciated, however, that the update information associated with a resource can represent essentially any type of information presented in essentially any type of format.

In one embodiment, Node 2 (103*b*) operates to transmit the update information associated with resource A to each node having published a subscription object for resource A. More specifically, Node 2 (103*b*) is operated to cache and distribute the update information to each node having published a subscription object for resource A. The subscription object for a resource can include information regarding how the subscription is to be handled. For example, the subscription object for resource A produced by Node 3 (103*c*) can include information regarding a frequency at which Node 3 (103*c*) desires to receive updates to resource A. Node 2 (103*b*) will then operate to send updates to Node 3 (103*c*) in accordance with the update frequency established in the subscription object published by Node 3 (103*c*). It should be appreciated that subscription objects can include essentially any type of information relevant to how the subscribing node desires to interact with the published resource of interest.

In another embodiment, Node 2 (103*b*) can operate to notify each node having published a subscription object for resource A that update information is available. In this embodiment, each node having published an interest in resource A is responsible for actively retrieving the update associated with resource A from Node 2 (103*b*).

As described above, use of subscription objects for published resources within the P2P network serves to relieve the node responsible for producing a particular resource from the additional responsibilities of distributing the resource and providing notifications associated with the resource. Hashing operations and DHTs are used to co-locate subscription objects and publish objects for a resource on a responsible node. Thus, the responsible node maintains a subscription registry for the resource. The responsible node and each node present on the subscription registry for the resource can be considered an interest-based sub-grid within the P2P network. The interest-based sub-grid represents a localization of event subscriptions within the P2P network.

Nodes within the P2P network that are interested in a resource are capable of establishing a persistent query for the resource by publishing a subscription object for the resource on the responsible node. Also, by hashing the key associated with the resource, a direct lookup can be performed to find subscriptions to the resource. Subscriptions to the resource can be used to define a list of subscribers or members of an interest-based sub-grid associated with the resource. Additionally, use of DHTs to assign resource responsibilities ensures that the nodes within the P2P network are assigned a substantially uniform amount of responsibility for published resources.

As described above, the present invention provides for event notification in a decentralized P2P network environment. Also, through establishment of interest-specific sub-grids, the present invention provides for efficient event propagation across the P2P network. Exemplary method embodiments of the present invention are further described below with respect to FIGS. 3 through 5. Also, with respect to FIGS. 3 through 5, nodes within the P2P network are distinguished as a first node, a second node, and a third node, for the purpose of clarity. It should be understood that use of terms "first", "second", and "third" in describing the method embodiments of FIGS. 3 through 5 is not intended to imply hierarchy or sequence.

Figure 3:
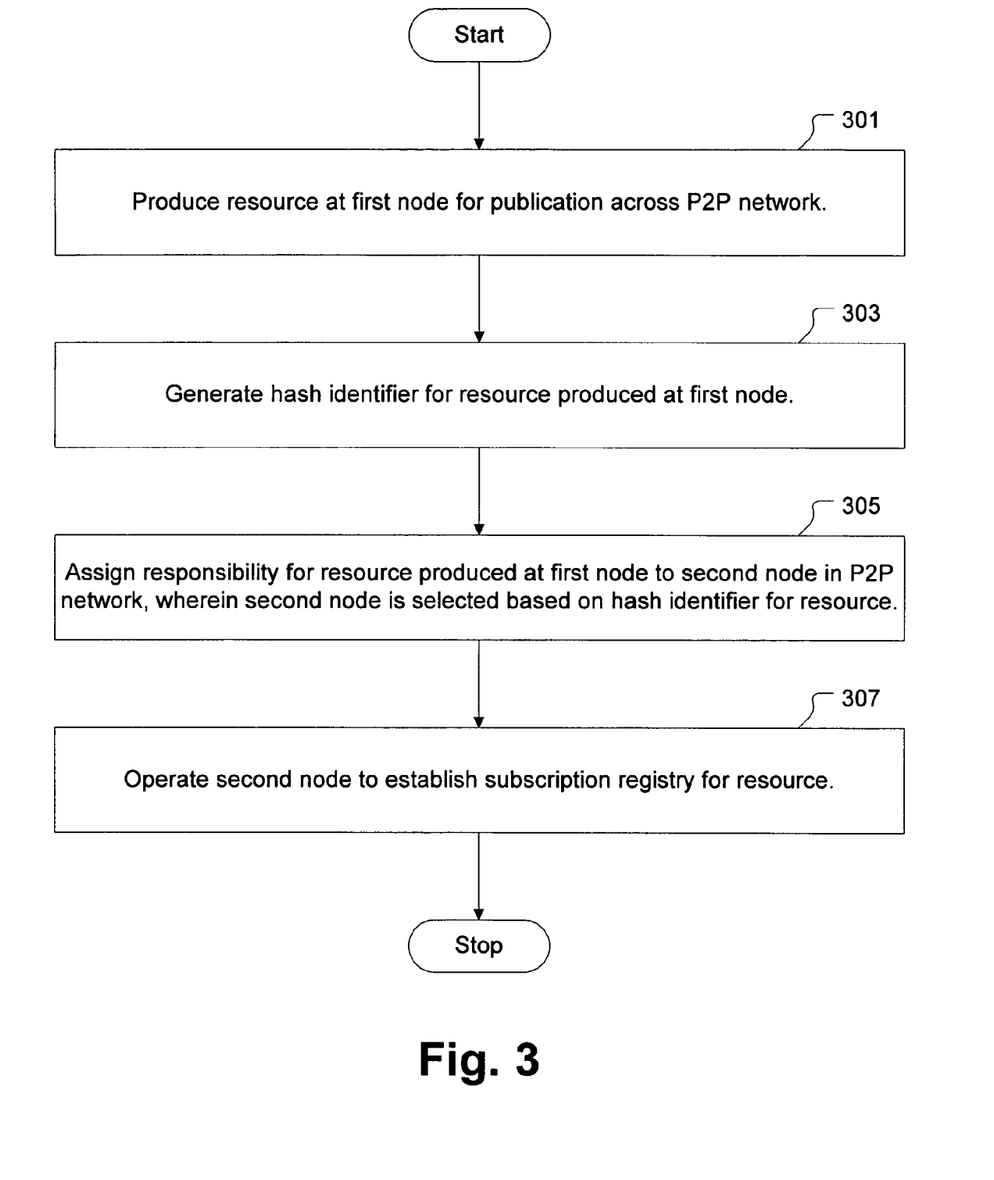
FIG. 3 is an illustration showing a flowchart of a method for establishing a subscription registry for a published resource in a P2P network, in accordance with one embodiment of the present invention.

FIG. 3 is an illustration showing a flowchart of a method for establishing a subscription registry for a published resource in a P2P network, in accordance with one embodiment of the present invention. The method includes an operation 301 in which a resource is produced at a first node for publication across the P2P network. In an operation 303, a hash value is generated for the resource produced in the operation 301. The hash value is generated by performing a hashing operation on a key associated with the resource. In an operation 305, responsibility for the resource produced at the first node is assigned to a second node within the P2P network, wherein the second node is responsible for a hash value range that bounds the hash value generated for the resource in the operation 303. In one embodiment, assignment of responsibility for the resource can be accomplished by transmitting a publish object for the resource from the first node to the second node, wherein the publish object represents a pointer to the resource produced at the first node. In an operation 307, the second node is operated to establish a subscription registry for the resource. In one embodiment, the subscription registry is established by compiling subscription objects for the resource as received from nodes across the P2P network, wherein each subscription object for the resource represents an address to a node in the P2P network that is interested in the resource.

Figure 4:
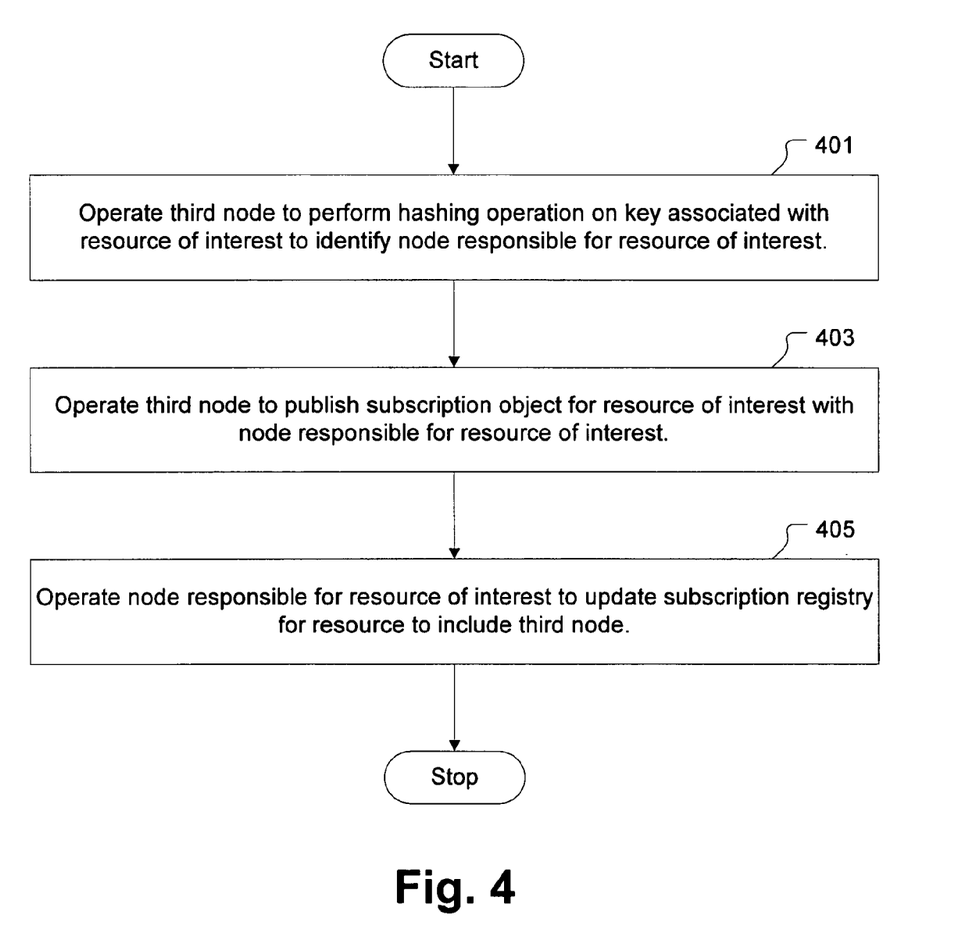
FIG. 4 is an illustration showing a flowchart of a method for subscribing to a resource published within a P2P network, in accordance with one embodiment of the present invention.

FIG. 4 is an illustration showing a flowchart of a method for subscribing to a resource published within a P2P network, in accordance with one embodiment of the present invention. The method includes an operation 401 in which a third node within the P2P network is operated to perform a hashing operation on a key associated with the resource of interest. The hashing operation generates a hash value that is used to identify a second node responsible for the resource of interest. With respect to FIG. 4, the second node can be considered equivalent to the second node previously described with respect to FIG. 3. In an operation 403, the third node is operated to publish a subscription object for the resource of interest. The subscription object is assigned the same hash value as the resource itself. Therefore, the subscription object is transmitted to the second node responsible for the resource of interest. In an operation 405, the second node is operated to update a subscription registry for the resource to include the information contained within the subscription object published by the third node.

Figure 5:
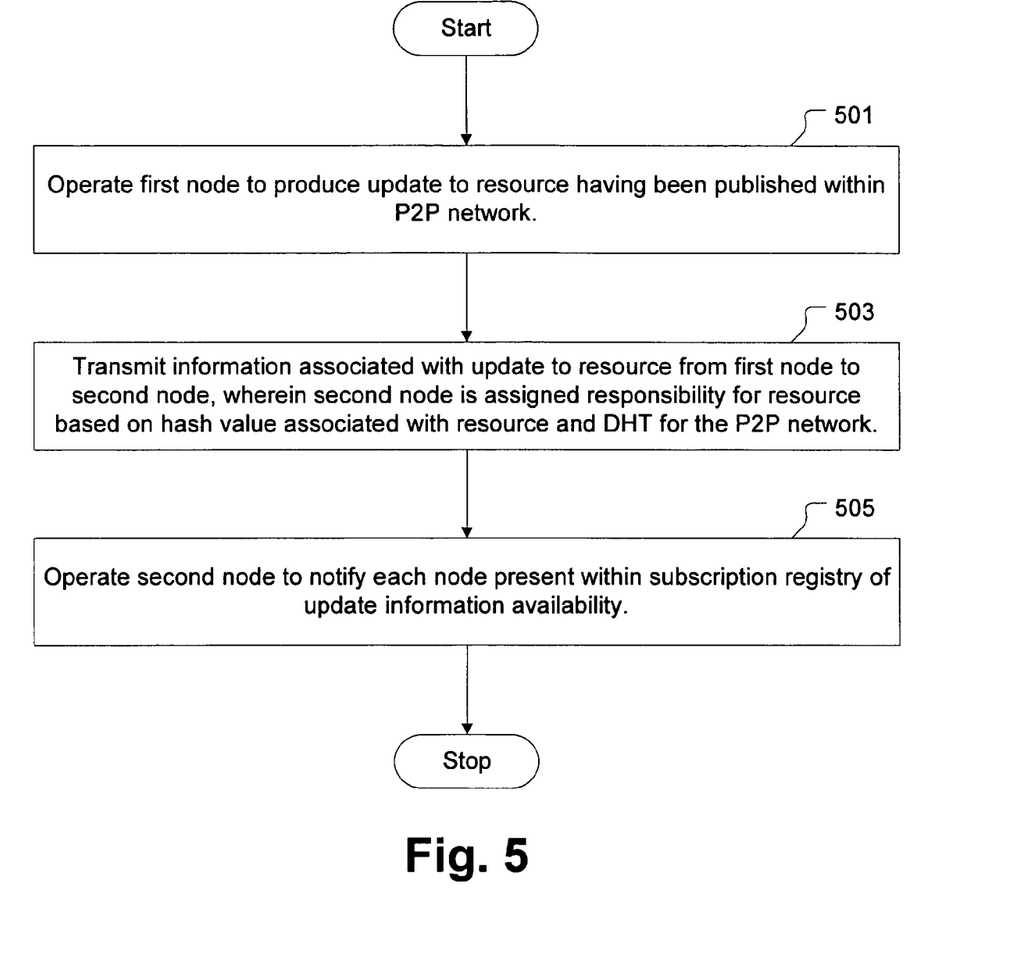
FIG. 5 is an illustration showing a flowchart of a method for providing event notification associated with a published resource in a P2P network, in accordance with one embodiment of the present invention.

FIG. 5 is an illustration showing a flowchart of a method for providing event notification associated with a published resource in a P2P network, in accordance with one embodiment of the present invention. In an operation 501, a first node is operated to produce an update to a resource having been published within the P2P network. With respect to FIG. 5, the first node can be considered equivalent to the first node previously described with respect to FIG. 3. In an operation 503, information associated with the update to the resource is transmitted from the first node to a second node having been assigned responsibility for the resource based on a hash value associated with the resource and a DHT for the P2P network. With respect to FIG. 5, the second node can be considered equivalent to the second node previously described with respect to FIGS. 3 and 4. In an operation 505, the second node is operated to notify each node present within a subscription registry for the resource of the update information available for the resource. In an alternate embodiment, operation 505 is performed by sending the update information to each node present within the subscription registry, in accordance with the requirements of each node's subscription.

Figure 6:
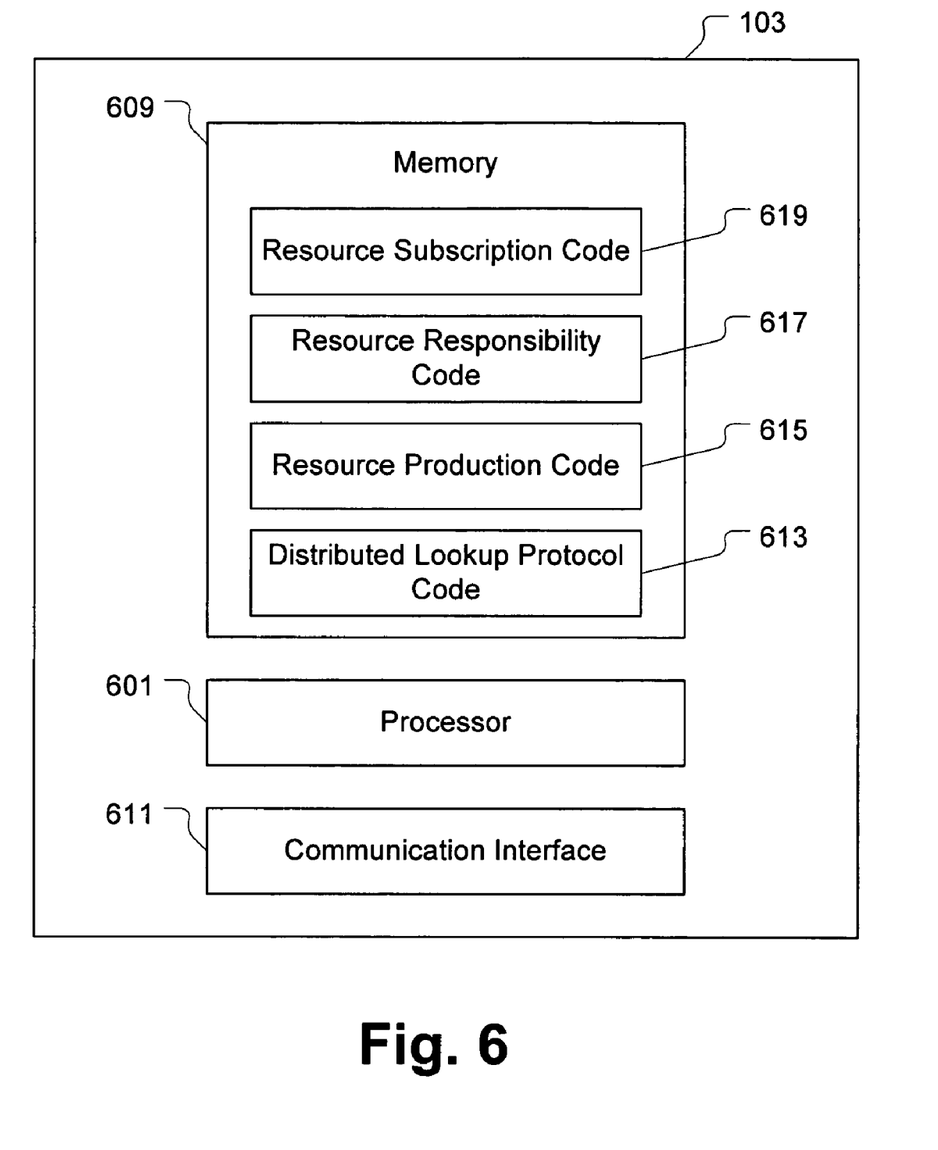
FIG. 6 is an illustration showing a block diagram of an exemplary node configured to operate in accordance with the present invention.

Each node within the P2P network represents a computing system configured to implement the requirements of the present invention for providing event notification within the P2P network. FIG. 6 is an illustration showing a block diagram of an exemplary node 103 configured to operate in accordance with the present invention. The node 103 includes a processor 107, a memory 109, and communication interface logic 111. It should be appreciated that the processor 107 and memory 109 can represent any compatible combination of processor and memory as known to those skilled in the art. The communication interface logic 111 is defined to enable either wired or wireless communication with one or more other nodes within the P2P network. Additionally, the node 103 can include other common computer components and peripheral devices, such as storage components, display components, user interface components, etc.

The memory 109 includes distributed lookup protocol code 613, resource production code 615, resource responsibility code 617, and resource subscription code 619. The distributed lookup protocol code 613 is defined to enable the node 103 to perform hashing operations and map hash values to nodes within the P2P network. For example, the distributed lookup protocol code 613 is defined to generated a hash value for a key associated with a resource, and identify a node within the P2P network responsible for a hash space containing the hash value for the resource. Thus, the distributed lookup protocol code 613 represents means for identifying a node within the P2P network that is responsible for a particular resource identifier.

The resource production code 615 is defined to enable the node 103 to produce a resource for publication across the P2P network. The resource production code 615 can be essentially any computer program capable of generating data that is of interest to other nodes connected to the P2P network. Thus, the resource production code 615 represents means for producing a resource for publication across the P2P network.

The resource responsibility code 617 is defined to enable the node 103 to accept and perform the responsibilities associated with a resource to be published across the P2P network. The responsibilities associated with the resource include maintaining a publish object for the resource, distributing the resource to requesting nodes, receiving communications regarding events associated with the resource, and notifying each node subscribed to the resource of events associated with the resource. Thus, the resource responsibility code 617 represents means for receiving communication regarding an event associated with the resource, and means for notifying each node having a subscription recorded in the subscription registry for the resource of the event associated with the resource.

The resource subscription code 619 is defined to enable the node 103 to establish and maintain a subscription registry for the resource. Thus, the resource subscription code 619 represents means for establishing and maintaining a subscription registry for the resource. The resource subscription code 619 also represents means for receiving subscription objects and recording corresponding subscription requests in the subscription registry for the resource.

In accordance with the foregoing, a node within a P2P network that is interested in a particular resource is capable of establishing a persistent query for the resource by publishing a corresponding subscription object. For example, consider a first node that is interested in subscribing to baseball scores for a particular team, e.g., "Giants." In this example, a key such as "Giants scores" can be used to identify the resource in which the node is interested. Through a hashing operation, a unique hash value can be generated for the key "Giants scores." The node interested in subscribing to the resource can then publish a subscription object for the key "Giants scores." The subscription object is transmitted to a second node within the P2P network that is responsible for a hash value range including the hash value associated with the key "Giants scores." The second node receives the subscription object from the first node and enters the corresponding subscription information, e.g., the first node's IP address, in a subscription registry for the resource "Giants scores."

A third node operating within the P2P network is responsible for producing a resource that provides current scores for the Giants baseball team. The third node also uses the key "Giants scores" to describe the corresponding resource. Through the hashing operation, the unique hash value for the key "Giants scores" is also generated by the third node. The third node uses the hash value for "Giants scores" to transmit a publish object for the corresponding resource to the second node. Consequently, the second node responsible for the hash value range including the hash value for the key "Giants scores" is assigned responsibility for the publish object and subscription objects associated with the "Giants scores" resource. Therefore, the publish object and the associated subscription objects for the resource "Giants scores" are co-located on the second node. Upon receipt of the "Giants scores" resource publish object from the third node, the second node operates to notify the first node of the availability of the "Giants scores" resource. In one example, this notification is performed by operating the second node to automatically send a copy of the "Giants scores" resource to first node. In another example, the first node responds to the notification by fetching the "Giants scores" resource from the third node using information available in the publish object for the "Giants scores" resource.

In a similar manner as described above, when the third node publishes an update to the "Giants scores" resource, a publish object for the update is also transmitted to the second node to be stored and distributed. In one embodiment, upon receipt of the update publish object, the second node operates to distribute the update to each node entered in the subscription registry for the "Giants scores" resource. Thus, the first node automatically receives the update to the "Giants scores" resource due to the presence of the subscription object, as published by the first node, within the corresponding subscription registry maintained by the second node. Hence, by using the hashing operation to establish the subscription object for the "Giants scores" resource, the first node effectively establishes a persistent query for the "Giants scores" resource. It should be appreciated that the example described above represents one of an essentially limitless number of diverse applications for which the present invention can be utilized.

It should be appreciated, that the present invention leverages the load balancing characteristics of distributed hash tables to assign resource notification responsibilities across the P2P network in a substantially balanced manner. It should be further understood that establishment of smaller, more specific resources allows responsibilities associated with a resource pool of the P2P network to be distributed among nodes in a more balanced manner. For instance, considering the baseball example above, a more balanced resource responsibility distribution can be obtained if separate resources are established for various aspects of the game, e.g., inning, score, hits, errors, etc., rather than establishing a single resource representing the game as a whole.

While embodiments described herein refer to a P2P network, it should be understood that the P2P network can be used for many purposes. For example, gaming applications can use a P2P network to interconnect and interact between two or more gaming applications and/or between two of more gaming consoles. The P2P network can also provide the intercommunication for enabling interactive gaming applications that can be used, i.e., played, by two or more users. Additionally, embodiments of the present invention as described herein may be incorporated into a computing device. The computing device may be represented as a video game console. For example, the computing device may be the "PLAYSTATION 2"® video game console manufactured by Sony Computer Entertainment Inc.

It should be appreciated that the embodiments described herein may also apply to on-line gaming applications. That is, the embodiments described herein may occur in a P2P network environment that sends a signal to multiple users, i.e., nodes or peers, over a distributed network (e.g., the Internet, LAN, WAN, wireless network, etc.) to enable players at remote locations to communicate and interact with each other. It should be further appreciated that embodiments described herein may be implemented as either hardware, software, or a combination thereof.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A system for event notification in a decentralized network of interconnected nodes, comprising:
   a first node defined to produce a resource for publication across the decentralized network;
   a second node defined to be responsible for a resource identifier for the resource produced by the first node, wherein the second node is defined to maintain a subscription registry for the resource that includes identifiers of nodes that are to receive the resource produced by the first node, and wherein the second node is defined to distribute the resource produced by the first node to each node having an identifier included within the subscription registry, such that the first node is not required to distribute the resource that it produces to nodes other than the second node; and
   a third node defined to identify the second node as being responsible for the resource identifier, the third node being further defined to publish a subscription object for the resource,
   wherein the second node responds to the subscription object by entering the third node on the subscription registry for the resource produced by the first node.

2. A system for event notification in a decentralized network of interconnected nodes as recited in claim 1, wherein a hash value associated with the resource produced by the first node being within a hash value range assigned to the second node causes the second node to be responsible for the resource.

3. A system for event notification in a decentralized network of interconnected nodes as recited in claim 1, wherein the first node is defined to identify the second node as being responsible for the resource identifier, the first node being further defined to transmit a publish object for the resource to the second node.

4. A system for event notification in a decentralized network of interconnected nodes as recited in claim 3, wherein the first node is defined to transmit publish objects for updates to the resource to the second node.

5. A system for event notification in a decentralized network of interconnected nodes as recited in claim 4, wherein the second node is defined to notify each node entered on the subscription registry for the resource of the update to the resource.

6. A system for event notification in a decentralized network of interconnected nodes as recited in claim 1, wherein a hash value associated with the subscription object for the resource is equivalent to a hash value associated with the resource, inclusion of the hash value associated with the subscription object for the resource within a hash value range assigned to the second node causing the second node to be responsible for the subscription object.

7. A system for event notification in a decentralized network of interconnected nodes as recited in claim 6, wherein the third node is defined to transmit the subscription object to the second node due to the second node being responsible for the hash value range including the hash value associated with the subscription object.

8. A system for event notification in a decentralized network of interconnected nodes as recited in claim 1, wherein the resource represents a data item.

9. A system for event notification in a decentralized network of interconnected nodes as recited in claim 1, wherein the subscription object for the resource produced by the first node includes an internet protocol address of a node interested in the resource.

10. A system for event notification in a decentralized network of interconnected nodes as recited in claim 9, wherein the subscription object for the resource produced by the first node includes instructions specifying a frequency at which updates to the resource are to be transmitted to the internet protocol address of the node interested in the resource.

11. A system for event notification in a decentralized network of interconnected nodes as recited in claim 1, wherein the subscription registry for the resource represents a compilation of published subscription objects for the resource.

12. A system for event notification in a decentralized network of interconnected nodes as recited in claim 1, wherein the decentralized network of interconnected nodes is defined as a peer-to-peer network.

13. A method for establishing a subscription registry for a published resource in a decentralized network of interconnected nodes, comprising:
   producing a resource at a first node for publication across a decentralized network;
   generating a hash value for the resource produced at the first node;
   identifying a second node as being responsible for a hash value range bounding the hash value generated for the resource; and
   assigning responsibility for the resource to the second node, whereby the second node is responsible for establishing and maintaining a subscription registry for the resource that includes identifiers of nodes that are to receive the resource produced by the first node, and whereby the second node is responsible for distributing the resource produced by the first node to each node having an identifier included within the subscription registry, such that the first node is not required to distribute the resource that it produces to nodes other than the second node.

14. A method for establishing a subscription registry for a published resource in a decentralized network of interconnected nodes as recited in claim 13, wherein generating the hash value for the resource includes performing a hashing operation on a key associated with the resource.

15. A method for establishing a subscription registry for a published resource in a decentralized network of interconnected nodes as recited in claim 13, wherein identifying the second node as being responsible for the hash value range bounding the hash value generated for the resource is performed using a distributed hash table defined for the decentralized network.

16. A method for establishing a subscription registry for a published resource in a decentralized network of interconnected nodes as recited in claim 13, wherein responsibility for the resource includes storing a publish object for the resource and distributing notifications associated with the resource to nodes having expressed interest in the resource.

17. A method for establishing a subscription registry for a published resource in a decentralized network of interconnected nodes as recited in claim 13, wherein establishing the subscription registry for the resource includes compiling subscription objects for the resource, the subscription objects being received from nodes across the decentralized network.

18. A method for establishing a subscription registry for a published resource in a decentralized network of interconnected nodes as recited in claim 17, wherein each subscription object for the resource includes an internet protocol address of a node interested in the resource.

19. A method for establishing a subscription registry for a published resource in a decentralized network of interconnected nodes as recited in claim 13, wherein the resource a data item.

20. A data storage device for storing data to be read by a computer system, the data storage device including program instructions for establishing a subscription registry for a published resource in a decentralized network of interconnected nodes, comprising:
program instructions for producing a resource at a first node for publication across a decentralized network;
program instructions for generating a hash value for the resource produced at the first node;
program instructions for identifying a second node as being responsible for a hash value range bounding the hash value generated for the resource; and
program instructions for assigning responsibility for the resource to the second node, whereby the second node is responsible for establishing and maintaining a subscription registry for the resource that includes identifiers of nodes that are to receive the resource produced by the first node, and whereby the second node is responsible for distributing the resource produced by the first node to each node having an identifier included within the subscription registry, such that the first node is not required to distribute the resource that it produces to nodes other than the second node.

21. A data storage device for storing data to be read by a computer system, the data storage device including program instructions for establishing a subscription registry for a published resource in a decentralized network of interconnected nodes as recited in claim 20, wherein the program instructions for generating the hash value for the resource includes program instruction for performing a hashing operation on a key associated with the resource.

22. A data storage device for storing data to be read by a computer system, the data storage device including program instructions for establishing a subscription registry for a published resource in a decentralized network of interconnected nodes as recited in claim 20, wherein the program instructions for identifying the second node as being responsible for the hash value range bounding the hash value generated for the resource includes program instructions for using a distributed hash table defined for the decentralized network.

23. A data storage device for storing data to be read by a computer system, the data storage device including program instructions for establishing a subscription registry for a published resource in a decentralized network of interconnected nodes as recited in claim 20, wherein responsibility for the resource includes storing a publish object for the resource and distributing notifications associated with the resource to nodes having expressed interest in the resource.

24. A data storage device for storing data to be read by a computer system, the data storage device including program instructions for establishing a subscription registry for a published resource in a decentralized network of interconnected nodes as recited in claim 20, wherein the program instructions for establishing the subscription registry for the resource includes program instructions for compiling subscription objects for the resource, the subscription objects being received from nodes across the decentralized network.

25. A data storage device for storing data to be read by a computer system, the data storage device including program instructions for establishing a subscription registry for a published resource in a decentralized network of interconnected nodes as recited in claim 24, wherein each subscription object for the resource includes an internet protocol address of a node interested in the resource.

26. A data storage device for storing data to be read by a computer system, the data storage device including program instructions for establishing a subscription registry for a published resource in a decentralized network of interconnected nodes as recited in claim 20, wherein the resource represents a data item.

27. A method for subscribing to a resource published within a decentralized network of interconnected nodes, comprising:
performing a hashing operation on a key that is uniquely associated with a resource, the hashing operation generating a hash value that is uniquely associated with the resource, wherein the resource is a data item;
publishing a subscription object for the resource at a node interested in the resource, the subscription object being assigned a hash value equivalent to the hash value associated with the resource, wherein the subscription object includes a reference to the node interested in the resource;
transmitting the subscription object from the node interested in the resource to a node responsible for the hash value associated with both the resource and the subscription object for the resource; and
operating the node responsible for the hash value associated with both the resource and subscription object for the resource to update a subscription registry for the resource to include information contained within the subscription object for the resource including the reference to the node interested in the resource.

28. A method for subscribing to a resource published within a decentralized network of interconnected nodes as recited in claim 27, wherein the subscription object for the resource includes an internet protocol address of a node publishing the subscription object for the resource.

29. A method for subscribing to a resource published within a decentralized network of interconnected nodes as recited in claim 28, wherein the subscription object for the resource includes instructions specifying a frequency at which updates to the resource are to be transmitted to the internet protocol address of the node publishing the subscription object for the resource.

30. A method for subscribing to a resource published within a decentralized network of interconnected nodes as recited in claim 27, wherein the subscription registry for the resource represents a compilation of published subscription objects for the resource.

31. A method for subscribing to a resource published within a decentralized network of interconnected nodes as recited in claim 27, further comprising:

operating the node responsible for the hash value associated with the resource to receive an update to the resource; and operating the node responsible for the hash value associated with the resource to transmit the update to the resource to each node having subscription object information included in the subscription registry for the resource.

32. A data storage device for storing data to be read by a computer system, the data storage device including program instructions for subscribing to a resource published within a decentralized network of interconnected nodes, comprising:

program instructions for performing a hashing operation on a key that is uniquely associated with a resource, the hashing operation generating a hash value that is uniquely associated with the resource, wherein the resource is a data item;

program instructions for publishing a subscription object for the resource at a node interested in the resource, the subscription object being assigned a hash value equivalent to the hash value associated with the resource, wherein the subscription object includes a reference to the node interested in the resource;

program instructions for transmitting the subscription object from the node interested in the resource to a node responsible for the hash value associated with both the resource and the subscription object for the resource; and program instructions for operating the node responsible for the hash value associated with both the resource and subscription object for the resource to update a subscription registry for the resource to include information contained within the subscription object for the resource including the reference to the node interested in the resource.

33. A data storage device for storing data to be read by a computer system, the data storage device including program instructions for subscribing to a resource published within a decentralized network of interconnected nodes as recited in claim 32, wherein the subscription object for the resource includes an internet protocol address of a node publishing the subscription object for the resource.

34. A data storage device for storing data to be read by a computer system, the data storage device including program instructions for subscribing to a resource published within a decentralized network of interconnected nodes as recited in claim 33, wherein the subscription object for the resource includes instructions specifying a frequency at which updates to the resource are to be transmitted to the internet protocol address of the node publishing the subscription object for the resource.

35. A data storage device for storing data to be read by a computer system, the data storage device including program instructions for subscribing to a resource published within a decentralized network of interconnected nodes as recited in claim 33, wherein the subscription registry for the resource represents a compilation of published subscription objects for the resource.

36. A data storage device for storing data to be read by a computer system, the data storage device including program instructions for subscribing to a resource published within a decentralized network of interconnected nodes as recited in claim 32, further comprising:

program instructions for operating the node responsible for the hash value associated with the resource to receive an update to the resource; and program instructions for operating the node responsible for the hash value associated with the resource to transmit the update to the resource to each node having subscription object information included in the subscription registry for the resource.

37. A computing device, comprising:

a processor; and a memory capable of storing program instructions to be executed by the processor, the program instructions including, computer code for accepting responsibility for a resource having a uniquely associated hash value within a hash value range assigned to the computing device, wherein the resource is a data item, computer code for establishing a subscription registry for the resource, computer code for receiving subscription objects that are uniquely associated with the resource from other computing devices and recording the subscription objects in the subscription registry, wherein each subscription object includes a reference to a computing device from which it is transmitted, and computer code for notifying computing devices having a recorded subscription object in the subscription registry of an event associated with the resource.

38. A computing device as recited in claim 37, wherein the computer code for accepting responsibility for the resource includes computer code for storing a publish object associated with the resource, computer code for receiving notifications associated with the resource, and computer code for distributing the resource and associated notifications to other computing devices.

39. A computing device as recited in claim 37, wherein the computer code for notifying computing devices of the event associated with the resource includes computer code for transmitting an update to the resource to the computing devices having the subscription object recorded in the subscription registry.

40. A computing device as recited in claim 37, wherein the subscription object includes an internet protocol address of a computing device subscribed to the resource.

41. A computing device as recited in claim 37, wherein the subscription registry for the resource represents a compilation of subscription objects for the resource.

42. A computing device as recited in claim 37, wherein the computing device is a game console.

43. A mechanism for providing event notification in a decentralized network of interconnected nodes, comprising:

means for establishing a subscription registry for a resource published within the decentralized network, wherein the resource is a data item;

means for receiving a subscription object for the resource from a node within the decentralized network, wherein the subscription object is uniquely associated with the resource, and wherein the subscription object includes a reference to the node from which it is transmitted;

means for recording the subscription object in the subscription registry for the resource;

means for receiving an update to the resource; and means for notifying each node having a subscription object recorded in the subscription registry for the resource of the update to the resource.

44. A mechanism for providing event notification in a decentralized network of interconnected nodes as recited in claim 43, wherein the subscription object for the resource includes an internet protocol address of a node publishing the subscription object for the resource.

45. A mechanism for providing event notification in a decentralized network of interconnected nodes as recited in claim 43, wherein the means for notifying each node of the update to the resource includes means for transmitting the update to the resource to each node having a subscription object recorded in the subscription registry for the resource.

* * * * *